(12) United States Patent
Huang et al.

(10) Patent No.: US 10,051,030 B2
(45) Date of Patent: Aug. 14, 2018

(54) INTERACTIVE SEARCHING AND RECOMMANDING METHOD AND APPARATUS

(71) Applicant: Baidu Online Network Technology (Beijing) Co., Ltd., Beijing (CN)

(72) Inventors: Jizhou Huang, Beijing (CN); Haifeng Wang, Beijing (CN); Ying Li, Beijing (CN); Minghua Zhao, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 541 days.

(21) Appl. No.: 14/577,684

(22) Filed: Dec. 19, 2014

(65) Prior Publication Data
US 2015/0293978 A1 Oct. 15, 2015

(30) Foreign Application Priority Data
Apr. 11, 2014 (CN) .......................... 2014 1 0145997

(51) Int. Cl.
G06F 17/30 (2006.01)
H04L 29/08 (2006.01)

(52) U.S. Cl.
CPC ........ H04L 67/02 (2013.01); G06F 17/30867 (2013.01); G06F 17/30882 (2013.01)

(58) Field of Classification Search
CPC ......... G06F 17/30882; G06F 17/30867; G06F 17/3005; G06F 17/30112; G06F 17/30554;
(Continued)

(56) References Cited

U.S. PATENT DOCUMENTS 7,500,190 B1 * 3/2009 Bhatt .................. G11B 27/034
345/440.1
7,801,885 B1 * 9/2010 Verma ............... G06F 17/30867
707/713
(Continued)

FOREIGN PATENT DOCUMENTS

CN 101099152 A 1/2008
CN 102033955 A 4/2011
(Continued)

OTHER PUBLICATIONS

Peter Anick, Using Terminological Feedback for Web Search Refinement—A Log-based Study, 2003, 8 pages.*
(Continued)

*Primary Examiner* — Noosha Arjomandi
(74) *Attorney, Agent, or Firm* — David D. Brush; Westman, Champlin & Koehler, P.A.

(57) ABSTRACT

An interactive searching and recommending method and apparatus are provided. The method includes following steps. A search query is received, a plurality of search results associated with the search query are obtained, the plurality of search results are analyzed so as to obtain at least one recommended item and a recommended content corresponding to the recommended item, a search webpage is provided and the plurality of search results and the at least one recommended item are displayed in the search webpage, and a triggering operation on the recommended item is received and the recommended content corresponding to the triggered recommended item is displayed within the search webpage according to the triggering operation.

9 Claims, 5 Drawing Sheets

(58) Field of Classification Search
CPC ......... G06F 17/30696; G06F 17/30769; G06F 17/30837; G06F 17/30991; G06F 17/30651; H04N 21/472; G11B 27/34; G11B 27/32
See application file for complete search history.

(56) References Cited

U.S. PATENT DOCUMENTS

| | | | |
|---|---|---|---|
| 8,510,287 | B1 | 8/2013 | Wu et al. |
| 8,600,979 | B2 | 12/2013 | Kim et al. |
| 8,700,118 | B2 | 4/2014 | Oster et al. |
| 9,183,187 | B2 | 11/2015 | Iwasaki |
| 9,531,862 | B1* | 12/2016 | Vadodaria ......... H04M 1/72552 |
| 9,892,156 | B2* | 2/2018 | Gupta ............... G06F 17/30395 |
| 2006/0195521 | A1* | 8/2006 | New ................. G06F 17/30766 709/204 |
| 2006/0288000 | A1* | 12/2006 | Gupta ............... G06F 17/30867 |
| 2009/0013002 | A1* | 1/2009 | Eggink ............. G06F 17/30702 |
| 2009/0083232 | A1 | 3/2009 | Ives et al. |
| 2009/0240683 | A1 | 9/2009 | Lazier et al. |
| 2010/0088322 | A1* | 4/2010 | Chowdhury ...... G06F 17/30864 707/751 |
| 2011/0191363 | A1 | 8/2011 | Bell et al. |
| 2012/0010979 | A1* | 1/2012 | Ramer .............. G06Q 30/0247 705/14.46 |
| 2012/0066064 | A1* | 3/2012 | Yoder .................. G06Q 30/00 705/14.53 |
| 2012/0197752 | A1* | 8/2012 | Shen ................. G06F 17/30643 705/26.7 |
| 2012/0317239 | A1* | 12/2012 | Mulder .............. G06Q 10/101 709/219 |
| 2014/0040228 | A1* | 2/2014 | Kritt ................ G06F 17/30554 707/706 |
| 2014/0222788 | A1* | 8/2014 | Noelle ............. G06F 17/30424 707/722 |
| 2015/0081440 | A1* | 3/2015 | Blemaster .......... G06Q 30/0256 705/14.54 |

FOREIGN PATENT DOCUMENTS

| | | |
|---|---|---|
| CN | 102142026 A | 8/2011 |
| CN | 103440286 A | 12/2013 |
| JP | 2007018489 A | 1/2007 |
| JP | 2008520047 A | 6/2008 |
| JP | 2011002982 A | 1/2011 |
| JP | 2011070380 A | 4/2011 |
| JP | 2011519609 A | 7/2011 |
| JP | 2013061748 A | 4/2013 |
| JP | 2013196141 A | 9/2013 |
| JP | 2013534673 A | 9/2013 |
| WO | 2012043649 A1 | 4/2012 |

OTHER PUBLICATIONS

Baldonado et al., Guidelines for using multiple views in information visualization, 2000, 10 pages.*
European Office Action dated Aug. 5, 2015 for corresponding EP Application No. 14199174.5.
European Office Action dated Nov. 14, 2016 for corresponding EP Application No. 14199174.5.
English translation of the Japanese Office Action dated Mar. 25, 2016 for corresponding JP Application No. 2014-264340.
English translation of the Japanese Office Action dated Sep. 30, 2016 for corresponding JP Application No. 2014-264340.
English translation of the Japanese Office Action dated Aug. 9, 2016 for corresponding JP Application No. 201410145997.X.
English translation of the Japanese Office Action dated Jan. 9, 2017 for corresponding JP Application No. 201410145997.X.

* cited by examiner

| Ji Kaiting | Search |

Ji Kaiting Baidu encyclopedia
Ji Kaiting, born in 1991 in Hong Kong, is a daughter of Ji Haipeng who is the board chairman and CEO of Logan Property. She has a Bachelor's drgee of economics and Finance of University of London and enters "Forbes Billionaires List"in March, 2014.
Baike.baidu.com/2014-03-05

Latest information about Ji Kaiting
The twenty four years old girl Ji Kaiting has been the youngest billionaire in "Forbes Billionaires List"
Ji Kaiting, the daughter of Ji Haipeng who is the CEO of a domestic capital property stock "Logan Property"(3308) that goes public in Hong Kong at the end of last year, is the non-executive director of Logan Property and takes the place of another founder "Dustin Moskovitz"of Facebook to be the youngest billionaire as being twenty four years old in "Forbes Billionaires List".
24 years old non-executive director of Logan Property, Ji Kaiting, has been the youngest billionaire in Forbes.
24 years old Chinese girl, Ji Kaiting, has been the youngest billionaire in "Forbes Billionaires List".
24 years old girl, Ji Kaiting, has been the youngest billionaire in "Forbes Billionaires List" with a total asset of 1.3 Billions
24 years old girl, Ji Kaiting, has been the youngest billionaire in the world with a total asset of 1.3 Billions.

12 notable able women in Asia business in 2014 evaluated by "Forbes": Zhu Jirong and Ji Kaiting are selected.
March 4, 2014-"Forbes"evaluated 12 notable able women in Asia business in 2014, and Zhu Jirong and Ji Kaiting are selected-March 4, 2014 14:31-source: Reference News-writer: I want to speak
www.txcs88.cn/easy_456...html 2014-03-04-Baidu Snapshot

INTERACTIVE SEARCHING AND RECOMMANDING METHOD AND APPARATUS

CROSS REFERENCE TO RELATED APPLICATION

This application claims priority and benefits of Chinese Patent Application No. 201410145997.X, filed with State Intellectual Property Office on Apr. 11, 2014, the entire content of which is incorporated herein by reference.

FIELD

Embodiments of the present invention generally relate to an internet technology, and more particularly, to an interactive searching and recommending method and apparatus.

BACKGROUND

With the development of the internet and the increase of the webpage information, the user has a high requirement for the search function of the search engine. In order to satisfy the requirements of the user, when the user input a query, the search engine also recommends other information corresponding to other queries associated with the current query to the user, instead of just providing the search result associated with the query. For example, when the user searches for "Zhou Jielun", the search engine recommends that "other persons searched for 'Deng Lijun', 'Wu Yuetian' and 'Cai Yilin'".

Currently, the recommended content usually is associated with the current query. However, in the actual search process, the user may be interested in a part of the search results and hope to obtain further information on this content. Thus, the current recommending method cannot satisfy this search requirement of the user. Based on the current recommending method, it is needed for the user to perform more search operations such as clicking the search result and re-entering a search query to perform another search, thus resulting in a poor search experience of the user during the process of gaining knowledge.

SUMMARY

Embodiments of the present invention seek to solve at least one of the problems existing in the related art to at least some extent.

Accordingly, a first objective of the present disclosure is to provide an interactive searching and recommending method, which can recommend a search result for a user automatically, thus improving the relevance of the search result to a search intention of the user and reducing a cost of obtaining knowledge.

A second objective of the present disclosure is to provide an interactive searching and recommending apparatus.

In order to achieve above objectives, according to embodiments of a first aspect of the present disclosure, an interactive searching and recommending method is provided, including: receiving a search query; obtaining a plurality of search results associated with the search query; analyzing the plurality of search results so as to obtain at least one recommended item and a recommended content corresponding to the recommended item; providing a search webpage and displaying the plurality of search results and the at least one recommended item in the search webpage; and receiving a triggering operation on the recommended item and displaying the recommended content corresponding to the triggered recommended item within the search webpage according to the triggering operation.

With the interactive searching and recommending method according to embodiments of the present disclosure, the recommended item may be obtained and displayed by analyzing the search results, and the commended content corresponding to the triggered recommended item is displayed dynamically in the search webpage according to the triggering operation on the recommended item, and thus the expanded information associated with the search results can be recommended for the user in real time. In addition, another recommending entry is provided for the user, a thirst for knowledge of the user is activated, the relevance of the search results and the accuracy and richness of the recommended content are improved, the search operation of the user is reduced and a time to obtain information for the user is decreased. Also, a space in a display webpage can be made full use of, an intelligent interaction search at a certain level is implemented and an enjoyment thereof is improved.

According to embodiments of a second aspect of the present disclosure, an interactive searching and recommending apparatus is provided, including: a receiving module configured to receive a search query; a first obtaining module configured to obtain a plurality of search results associated with the search query; a second obtaining module configured to analyze the plurality of search results so as to obtain at least one recommended item and a recommended content corresponding to the recommended item; a displaying module configured to provide a search webpage and to display the plurality of search results and the at least one recommended item in the search webpage; and a recommending module configured to receive a triggering operation on the recommended item and to display the recommended content corresponding to the triggered recommended item within the search webpage according to the triggering operation.

With the interactive searching and recommending apparatus according to embodiments of the present disclosure, the recommended item may be obtained and displayed by analyzing the search results, and the commended content corresponding to the triggered recommended item is displayed dynamically in the search webpage according to the triggering operation on the recommended item, and thus the expanded information associated with the search results can be recommended for the user in real time. In addition, another recommending entry is provided for the user, a thirst for knowledge of the user is activated, the relevance of the search results and the accuracy and richness of the recommended content are improved, the search operation of the user is reduced and a time to obtain information for the user is decreased. Also, a space in a display webpage can be made full use of, an intelligent interaction search at a certain level is implemented and an enjoyment thereof is improved.

According to embodiments of a third aspect of the present disclosure, a non-transitory computer-readable storage medium is provided, including one or more programs for executing steps of: receiving a search query; obtaining a plurality of search results associated with the search query; analyzing the plurality of search results so as to obtain at least one recommended item and a recommended content corresponding to the recommended item; providing a search webpage and displaying the plurality of search results and the at least one recommended item in the search webpage; and receiving a triggering operation on the recommended item and displaying the recommended content corresponding to the triggered recommended item within the search webpage according to the triggering operation.

Additional aspects and advantages of embodiments of present invention will be given in part in the following descriptions, become apparent in part from the following descriptions, or be learned from the practice of the embodiments of the present invention.

BRIEF DESCRIPTION OF THE DRAWINGS

These and other aspects and advantages of embodiments of the present invention will become apparent and more readily appreciated from the following descriptions made with reference to the accompanying drawings, in which:

FIG. 3 is a schematic diagram of a search webpage according to an embodiment of the present disclosure;

DETAILED DESCRIPTION

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

In the description of the present disclosure, "a plurality of" relates to two or more than two; terms such as "first" and "second" are used herein for purposes of description and are not intended to indicate or imply relative importance or significance.

An interactive searching and recommending method and apparatus according to embodiments will be described in the following with reference to drawings.

In order to recommend a recommended content in comply with a search intention of a user to the user, an interactive searching and recommending method is provided by embodiments of the present. The method includes: receiving a search query; obtaining a plurality of search results associated with the search query; analyzing the plurality of search results so as to obtain at least one recommended item and a recommended content corresponding to the recommended item; providing a search webpage and displaying the plurality of search results and the at least one recommended item in the search webpage; and receiving a triggering operation on the recommended item and displaying the recommended content corresponding to the triggered recommended item within the search webpage according to the triggering operation.

Figure 1:
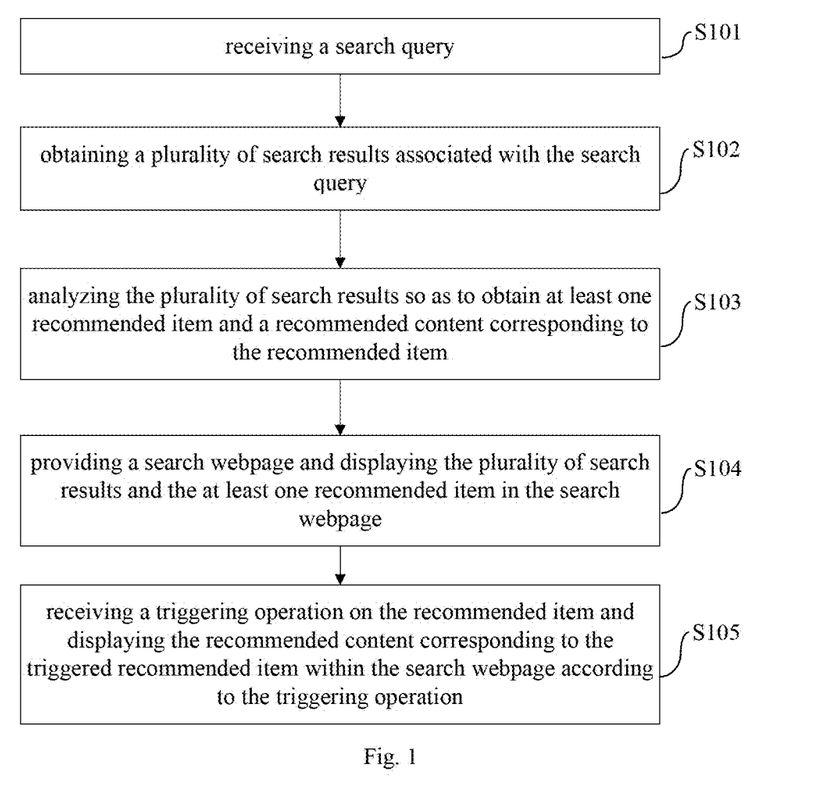
FIG. 1 is a flow chart of an interactive searching and recommending method according to an embodiment of the present disclosure.

FIG. 1 is a flow chart of an interactive searching and recommending method according to an embodiment of the present disclosure.

As shown in FIG. 1, the interactive searching and recommending method according to embodiments of the present disclosure includes following steps.

At step S101, a search query is received.

The search query may be one of characters (such as a word, a phonetic alphabet, a symbol and/or a number) from various languages or a combination of the characters.

At step S102, a plurality of search results associated with the search query are obtained.

At step S103, the plurality of search results are analyzed so as to obtain at least one recommended item and a recommended content corresponding to the recommended item.

In an embodiment of the present disclosure, the recommended content corresponding to the recommended item may include a related entity of the recommended item. For example, for a recommended item "Forbes Billionaires List", the recommended content corresponding thereto may be a person in the Forbes Billionaires List. The recommended content may also include a description of the recommended item. For example, for a recommended item "University of London", the recommended content corresponding thereto may be the description of the University of London, such as a school overview, a notable schoolmate, a geographical location and a department setup.

In other embodiments of the present disclosure, an interested point of the user may be obtained according to hot contents in the internet, in which the hot content may be a content of a hot search or a highly exposed content which may be obtained by analyzing a search history of the user and a hot topic of discussion in a social network site or a forum.

Figure 2:
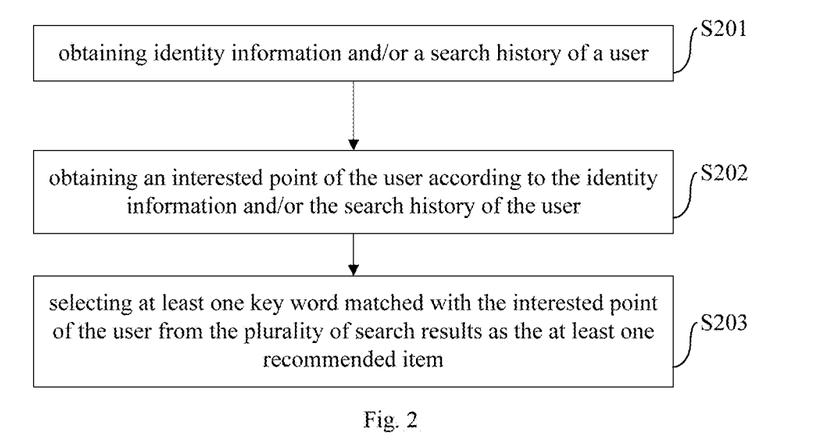
FIG. 2 is a flow chart of a method for analyzing a plurality of search results to obtain at least one recommended item according to an embodiment of the present disclosure.

In an embodiment of the present disclosure, the plurality of search results may be analyzed by a method shown in FIG. 2 to obtain the at least one recommended item.

At step S201, identity information and/or a search history of the user are obtained.

In an embodiment of the present disclosure, the identify information may be the information (such as an ID or account of the user) that can identify an identification of the user uniquely. The search history may be the search history of a current user or the search history of different users in the internet.

At step S202, an interested point of the user is obtained according to the identity information and/or the search history of the user.

In some embodiments of the present disclosure, the search history of the current user may be counted and analyzed to obtain the interested point of the user, or a server is queried according to the identity information of the user to obtain the interested point of the user pre-stored in the server. For example, if user A searches entertainment news constantly, a star name, a group name, a film name or a song name may be treated as the interested point of user A. A larger number of interested points of different users are pre-stored in the server, in which the larger number of interested points may be set by the different users themselves or be obtained by counting and analyzing by the server according to the search history of each user.

In some embodiments of the present disclosure, the search histories of different users in the internet may be counted and analyzed to obtain the interested points of all the users in the whole internet. For example, if a large number of users search for a related content of "billionaires list" in a certain period, "youngest billionaires list" and "Forbes billionaires list" related with "billionaires list" may be treated as the interested pointes of the user.

At step S203, at least one key word matched with the interested point of the user is selected from the plurality of search results as the at least one recommended item.

In an embodiment of the present disclosure, a character recognition and a semantic analysis are performed on the search query and abstract descriptions of the plurality of search results related with the search query, such that the key word matched with the interested point of the user is selected from the plurality of search results and the selected key word is treated as the recommended item.

At step S104, a search webpage is provided and the plurality of search results and the at least one recommended item is displayed in the search webpage.

In an embodiment of the present disclosure, in order to identify the recommended item, a recommending mark may be displayed on the at least one recommended item in the search webpage. The recommending mark may be an underline, a highlight or a special color mark, and a concrete form of the recommending mark is not limited herein. FIG. 3 is a schematic diagram of a search webpage according to an embodiment of the present disclosure. As shown in FIG. 3, when the user searches for "Ji Kaiting", each recommended item may be marked out by a dotted underline during displaying the plurality of search results in the search webpage.

At step S105, a triggering operation on the recommended item is received and the recommended content corresponding to the triggered recommended item is displayed in the search webpage according to the triggering operation.

In an embodiment of the present disclosure, the triggering operation may be a mouseover operation or click operation, or one of other possible operation modes. For example, the triggering operation may be a touch operation in a touchscreen mobile terminal, and a form of the triggering operation is not limited herein.

Figure 4A:
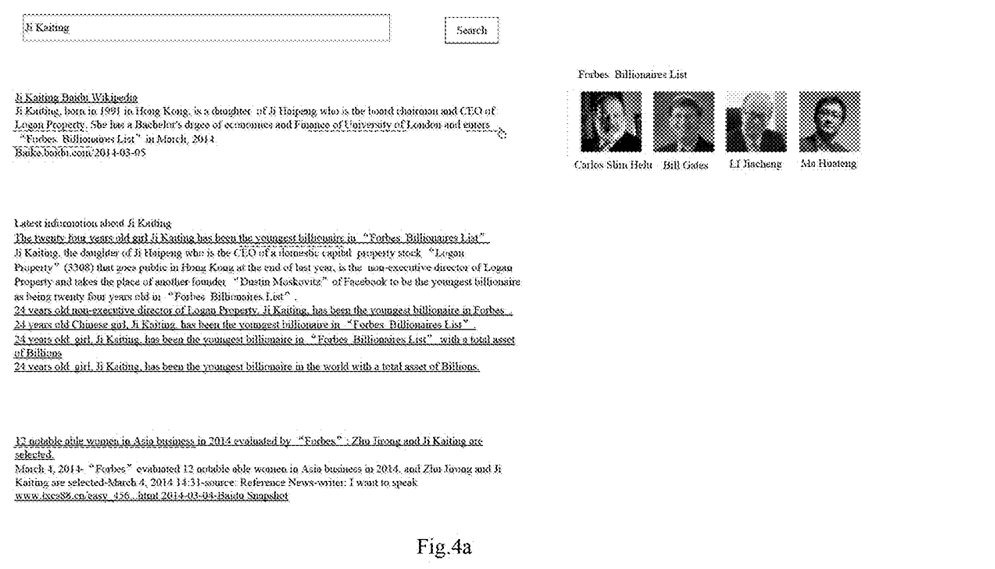
FIG. 4a is a schematic diagram of a search webpage according to an embodiment of the present disclosure.
Figure 4B:
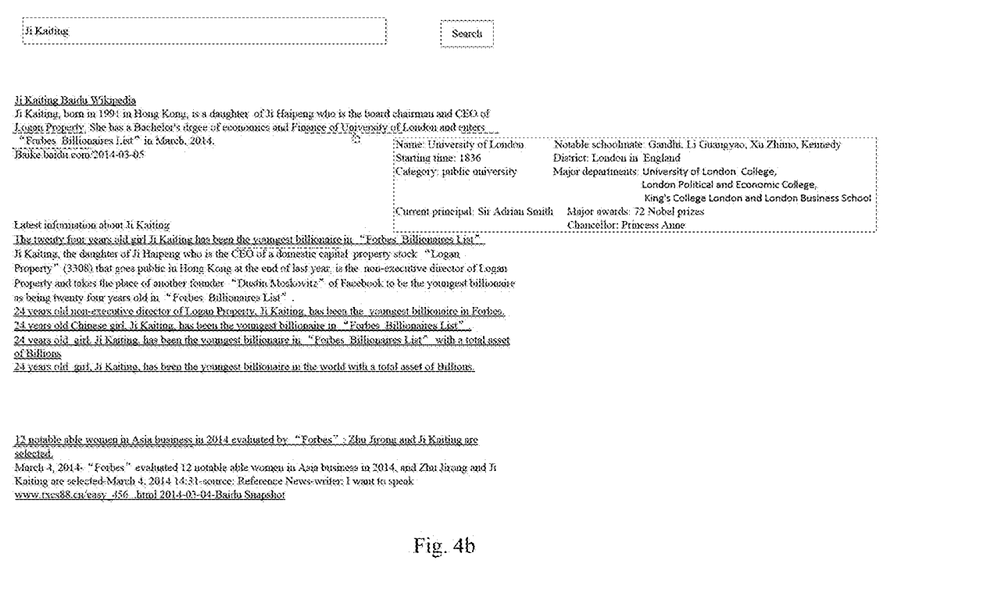
FIG. 4b is a schematic diagram of a search webpage according to an embodiment of the present disclosure.
Figure 4C:
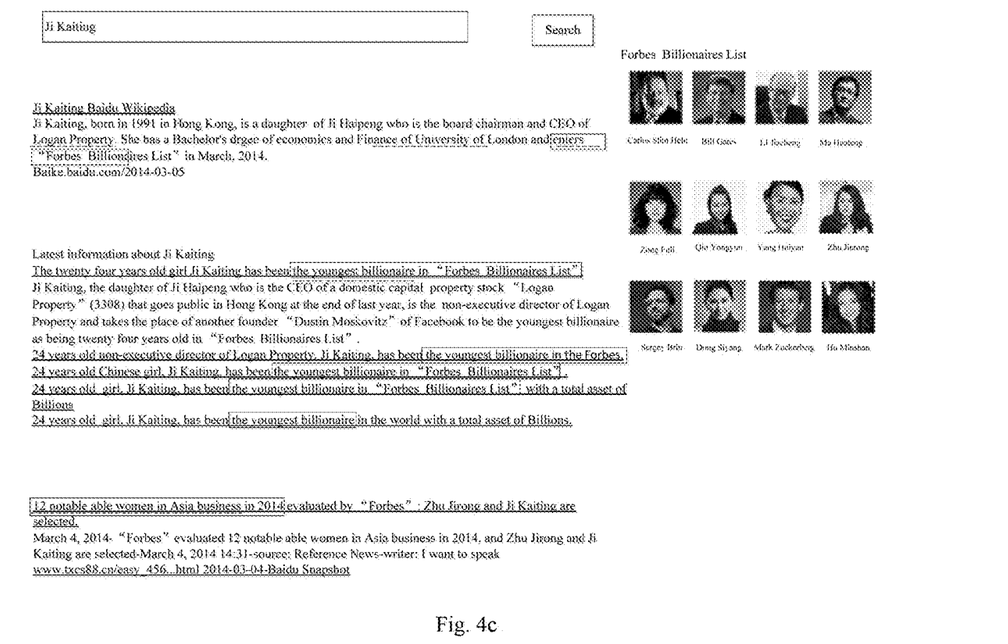
FIG. 4c is a schematic diagram of a search webpage according to an embodiment of the present disclosure.

FIG. 4a, FIG. 4b and FIG. 4c are schematic diagrams of a search webpage according to an embodiment of the present disclosure. In an embodiment of the present disclosure, as shown in FIG. 4, when the recommended item is triggered, if the recommended content corresponding to the recommended item is the related entity of the recommended item, a first displaying part and a second displaying part are displayed in the search webpage, and the plurality of search results are displayed in the first displaying part and the recommended content corresponding to the triggered recommended item is displayed in the second displaying part. As shown in FIG. 4b, if the recommended content corresponding to the recommended item is the description of the recommended item, a floating layer display window is provided around the triggered recommended item and the recommended content corresponding to the triggered recommended item is displayed in the floating layer display window.

In some embodiments of the present disclosure, as shown in FIG. 4c, when there are a plurality of recommended items and the recommended content of each recommended item is the related entity thereof, each recommended item and the corresponding recommended content are displayed in the second displaying part and each recommended item is identified in the first displaying part (for example, identified by using a rectangular box) without the triggering operation, such that the user can know a relationship between each recommended item and the recommended content intuitively.

In some embodiments of the present disclosure, a part of the recommended content displayed in the floating layer display window is displayed in a link form, such that the user can further obtain the information thereof, for example, "notable schoolmate" in FIG. 4b is a link. Similarly, the recommended content displayed in the second displaying part is displayed in the link form, such that various resources may be guided and it is convenient to stimulate a quantity of flow.

With the interactive searching and recommending method according to embodiments of the present disclosure, the recommended item may be obtained and displayed by analyzing the search results, and the commended content corresponding to the triggered recommended item is displayed dynamically in the search webpage according to the triggering operation on the recommended item, and thus the expanded information associated with the search results can be recommended for the user in real time. In addition, another recommending entry is provided for the user, a thirst for knowledge of the user is activated, the relevance of the search results and the accuracy and richness of the recommended content are improved, the search operation of the user is reduced and a time to obtain information for the user is decreased. Also, a space in the display webpage can be made full use of, an intelligent interaction search at a certain level is implemented and an enjoyment thereof is improved.

In order to achieve above embodiments of the present disclosure, an interactive searching and recommending apparatus is provided by embodiments of the present disclosure.

An interactive searching and recommending apparatus according to an embodiment of the present disclosure includes: a receiving module configured to receive a search query; a first obtaining module configured to obtain a plurality of search results associated with the search query; a second obtaining module configured to analyze the plurality of search results so as to obtain at least one recommended item and a recommended content corresponding to the recommended item; a displaying module configured to provide a search webpage and to display the plurality of search results and the at least one recommended item in the search webpage; and a recommending module configured to receive a triggering operation on the recommended item and to display the recommended content corresponding to the triggered recommended item within the search webpage according to the triggering operation.

Figure 5:
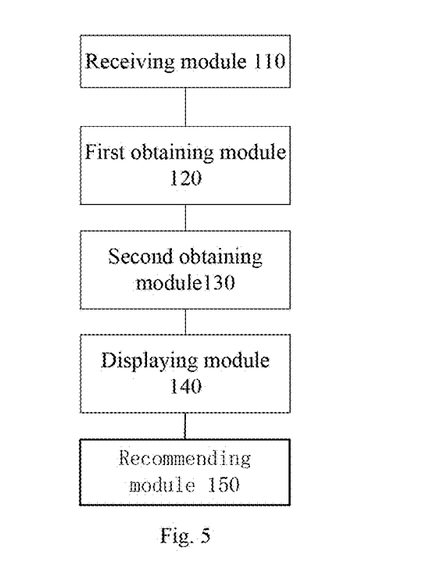
FIG. 5 is a block diagram of an interactive searching and recommending apparatus according to an embodiment of the present disclosure.

FIG. 5 is a block diagram of an interactive searching and recommending apparatus according to an embodiment of the present disclosure. As shown in FIG. 5, the interactive searching and recommending apparatus according to embodiments of the present disclosure includes a receiving module 110, a first obtaining module 120, a second obtaining module 130, a displaying module 140 and a recommending module 150.

The receiving module 110 is configured to receive a search query. The search query may be one of characters (such as a word, a phonetic alphabet, a symbol and/or a number) from various languages or a combination of the characters.

The first obtaining module 120 is configured to obtain a plurality of search results associated with the search query.

The second obtaining module 130 is configured to analyze the plurality of search results so as to obtain at least one recommended item and a recommended content corresponding to the recommended item. In an embodiment of the present disclosure, the recommended content corresponding to the recommended item may include a related entity of the recommended item. For example, for a recommended item "Forbes Billionaires List", the recommended content corresponding thereto may be a person in the Forbes Billionaires List. The recommended content may also include a description of the recommended item. For example, for a recommended item "University of London", the recommended content corresponding thereto may be the description of the University of London, such as a school overview, a notable schoolmate, a geographical location and a department setup.

In some embodiments of the present disclosure, an interested point of the user may be obtained according to hot contents in the internet, in which the hot content may be a content of a hot search or a highly exposed content which may be obtained by analyzing a search history of the user and a hot topic of discussion in a social network site or a forum.

The displaying module 140 is configured to provide a search webpage and to display the plurality of search results and the at least one recommended item in the search webpage. In an embodiment of the present disclosure, in order to identify the recommended item, the displaying module 140 displays a recommending mark on the at least one recommended item in the search webpage. The recommending mark may be an underline, a highlight or a special color mark, and a concrete form of the recommending mark is not limited herein. FIG. 3 is a schematic diagram of a search webpage according to an embodiment of the present disclosure. As shown in FIG. 3, when the user searches for "Ji Kaiting", each recommended item may be marked out by a dotted underline during displaying the plurality of search results in the search webpage.

The recommending module 150 is configured to receive a triggering operation on the recommended item and to display the recommended content corresponding to the triggered recommended item within the search webpage according to the triggering operation. In an embodiment of the present disclosure, the triggering operation may be a mouseover operation or click operation, or one of other possible operation modes. For example, the triggering operation may be a touch operation in a touch-screen mobile terminal, and a form of the triggering operation is not limited herein.

FIG. 4a, FIG. 4b and FIG. 4c are schematic diagrams of a search webpage according to an embodiment of the present disclosure. In an embodiment of the present disclosure, as shown in FIG. 4, when the recommended item is triggered, if the recommended content corresponding to the recommended item is the related entity of the recommended item, a first displaying part and a second displaying part are displayed in the search webpage, and the plurality of search results are displayed in the first displaying part and the recommended content corresponding to the triggered recommended item is displayed in the second displaying part. As shown in FIG. 4b, if the recommended content corresponding to the recommended item is the description of the recommended item, a floating layer display window is provided around the triggered recommended item and the recommended content corresponding to the triggered recommended item is displayed in the floating layer display window.

In some embodiments of the present disclosure, as shown in FIG. 4c, when there are a plurality of recommended items and the recommended content of each recommended item is the related entity thereof, each recommended item and the corresponding recommended content are displayed in the second displaying part and each recommended item is identified in the first displaying part (for example, identified by using a rectangular box) without the triggering operation, such that the user can know a relationship between each recommended item and the recommended content intuitively.

In some embodiments of the present disclosure, a part of the recommended content displayed in the floating layer display window is displayed in a link form, such that the user can further obtain the information thereof, for example, "notable schoolmate" in FIG. 4b is a link. Similarly, the recommended content displayed in the second displaying part may also be displayed in the link form, such that various resources may be guided and it is convenient to stimulate a quantity of flow.

With the interactive searching and recommending apparatus according to embodiments of the present disclosure, the recommended item may be obtained and displayed by analyzing the search results, and the commended content corresponding to the triggered recommended item is displayed dynamically in the search webpage according to the triggering operation on the recommended item, and thus the expanded information associated with the search results can be recommended for the user in real time. In addition, another recommending entry is provided for the user, a thirst for knowledge of the user is activated, the relevance of the search results and the accuracy and richness of the recommended content are improved, the search operation of the user is reduced and a time to obtain information for the user is decreased. Also, a space in the display webpage can be made full use of, an intelligent interaction search at a certain level is implemented and an enjoyment thereof is improved.

Figure 6:
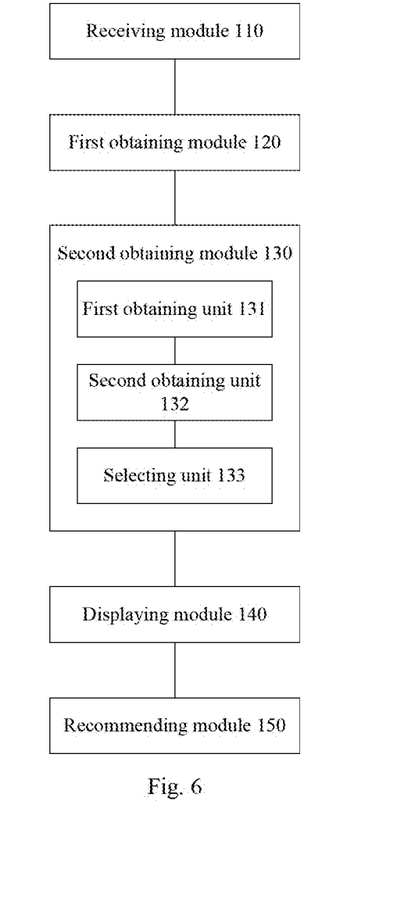
FIG. 6 is a block diagram of an interactive searching and recommending apparatus according to an embodiment of the present disclosure.

FIG. 6 is a block diagram of an interactive searching and recommending apparatus according to an embodiment of the present disclosure. As shown in FIG. 6, the interactive searching and recommending apparatus according to embodiments of the present disclosure includes a receiving module 110, a first obtaining module 120, a second obtaining module 130, a displaying module 140, a recommending module 150, a first obtaining unit 131, a second obtaining unit 132 and a selecting unit 133. The second obtaining module 130 includes the first obtaining unit 131, the second obtaining unit 132 and the selecting unit 133.

The first obtaining unit 131 is configured to obtain identity information and/or a search history of the user. In an embodiment of the present disclosure, the identify information may be the information (such as an ID or account of the user) that can identify an identification of the user uniquely. The search history may be the search history of a current user or the search history of different users in the internet.

The second obtaining unit 132 is configured to obtain an interested point of the user according to the identity information and/or the search history of the user. In some embodiments of the present disclosure, the search history of the current user may be counted and analyzed to obtain the interested point of the user, or a server is queried according to the identity information of the user to obtain the interested point of the user that pre-stored in the server. For example, if user A searches entertainment news constantly, a star name, a group name, a film name or a song name may be treated as the interested point of user A. A larger number of interested points of different users are pre-stored in the server, in which the larger number of interested points may be set by the different users themselves or be obtained by counting and analyzing by the server according to the search history of each user.

In some embodiments of the present disclosure, the search histories of different users in the internet may be counted and analyzed to obtain the interested points of all the users in the whole internet. For example, if a large number of users search for a related content of "billionaires list" in a certain period, "youngest billionaires list" and "Forbes Billionaires List" related with "billionaires list" may be treated as the interested pointes of the user.

The selecting unit 133 is configured to select at least one key word matched with the interested point of the user from the plurality of search results as the at least one recommended item. In an embodiment of the present disclosure, the character recognition and the semantic analysis are performed on the search query and abstract descriptions of the plurality of search results related with the search query, such that the key word matched with the interested point of the user is selected from the plurality of search results and the selected key word is treated as the recommended item.

With the interactive searching and recommending apparatus according to embodiments of the present disclosure, the interested point of the user is obtained according to the identify information and/or the search history of the user, and the recommended item is selected from the plurality of search results according to the interested point of the user, such that the recommended content may be in comply with the search intention of the user, thus satisfying an individual requirement of the user and improving the search experience of the user.

A non-transitory computer-readable storage medium is provided by embodiments of the present disclosure, which includes one or more programs for executing steps of: receiving a search query; obtaining a plurality of search results associated with the search query; analyzing the plurality of search results so as to obtain at least one recommended item and a recommended content corresponding to the recommended item; providing a search webpage and displaying the plurality of search results and the at least one recommended item in the search webpage; and receiving a triggering operation on the recommended item and displaying the recommended content corresponding to the triggered recommended item within the search webpage according to the triggering operation.

In some embodiments, analyzing the plurality of search results so as to obtain at least one recommended item includes: obtaining identity information and/or a search history of a user; obtaining an interested point of the user according to the identity information and/or the search history of the user; selecting at least one key word matched with the interested point of the user from the plurality of search results as the at least one recommended item.

In some embodiments, the one or more programs are further for executing a step of: displaying a recommending mark on the at least one recommended item in the search webpage.

In some embodiments, the recommended content includes a related entity of the recommended item and displaying the recommended content corresponding to the triggered recommended item within the search webpage according to the triggering operation includes: providing a first displaying part and a second displaying part in the search webpage, displaying the plurality of search results in the first displaying part and displaying the recommended content corresponding to the triggered recommended item in the second displaying part.

In some embodiments, the recommended content includes a description of the recommended item and displaying the recommended content corresponding to the triggered recommended item within the search webpage according to the triggering operation includes: providing a floating layer display window around the triggered recommended item and displaying the recommended content corresponding to the triggered recommended item in the floating layer display window.

In some embodiments, the triggering operation is a mouseover operation or click operation.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art. The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. An interactive searching and recommending method, comprising:
   receiving a search query;
   obtaining a plurality of search results associated with the search query;
   analyzing the plurality of search results so as to obtain a plurality of recommended items and recommended contents corresponding to the plurality of recommended items;
   providing a search webpage and displaying the plurality of search results and the plurality of recommended items in the search webpage; and
   receiving a triggering operation on at least some of the plurality of recommended items and displaying the recommended contents corresponding to the triggered recommended items within the search webpage according to the triggering operation,
   wherein analyzing the plurality of search results so as to obtain the plurality of recommended items comprises:
   obtaining identity information of a user;
   querying a server according to the identity information of the user to obtain an interested point of the user pre-stored in the server, wherein the interested point comprises either keywords known from the search history of the user or pre-stored keywords of the user;
   selecting a plurality of key words matched with the interested point of the user from the plurality of search results as the plurality of recommended items,
   wherein a part of the recommended contents corresponding to the recommended items triggered within the search webpage comprises related entities of the recommended items triggered within the search webpage, and displaying the recommended contents corresponding to the recommended items triggered within the search webpage according to the triggering operation comprises:
   providing a first displaying part and a second displaying part in the search webpage, displaying the plurality of search results in the first displaying part and displaying the recommended contents corresponding to the recommended items triggered in the second displaying part,
   wherein another part of the recommended contents corresponding to the recommended items triggered within the search webpage comprises descriptions of the recommended items, and displaying the recommended contents corresponding to the recommended items triggered within the search webpage according to the triggering operation comprises:
   providing a floating layer display window around the triggered recommended items and displaying the recommended contents corresponding to the triggered recommended items in the floating layer display window.

2. The method according to claim 1, further comprising: displaying recommending marks on the plurality of recommended items in the search webpage.

3. The method according to claim 1, wherein the triggering operation is a mouseover operation or click operation.

4. An interactive searching and recommending apparatus, comprising:
   a processor; and
   a memory storing instructions executable by the processor, which when executed configure the processor to:
   receive a search query;
   obtain a plurality of search results associated with the search query;
   analyze the plurality of search results so as to obtain a plurality of recommended items and recommended contents corresponding to the plurality of recommended items;
   provide a search webpage and display the plurality of search results and the plurality f recommended items in the search webpage; and
   receive a triggering operation on at least some of the plurality of recommended items and display the recommended contents corresponding to the recommended items triggered within the search webpage according to the triggering operation,
   wherein the processor is further configured to:
   obtain identity information of a user;
   query a server according to the identity information of the user to obtain an interested point of the user pre-stored in the server, wherein the interested point comprises either keywords known from the search history of the user or pre-stored keywords of the user;
   select a plurality of key words matched with the interested point of the user from the plurality of search results as the plurality of recommended items,
   wherein a part of the recommended contents corresponding to the recommended items triggered within the search webpage comprises related entities of the recommended items triggered within the search webpage, and the processor is further configured to:

provide a first displaying part and a second displaying part in the search webpage, display the plurality of search results in the first displaying part and display the recommended contents corresponding to the recommended items triggered in the second displaying part, wherein another part of the recommended contents corresponding to the recommended items triggered within the search webpage comprises descriptions of the recommended items, and the processor is further configured to:

provide a floating layer display window around the triggered recommended items and display the recommended contents corresponding to the triggered recommended items in the floating layer display window.

5. The apparatus according to claim 4, wherein the instructions further configure the processor to display recommending marks on the plurality of recommended items in the search webpage.

6. The apparatus according to claim 4, wherein the triggering operation is a mouseover operation or click operation.

7. A non-transitory computer-readable storage medium, comprising one or more programs for executing acts of:

receiving a search query;

obtaining a plurality of search results associated with the search query;

analyzing the plurality of search results so as to obtain a plurality of recommended items and recommended contents corresponding to the plurality of recommended items;

providing a search webpage and displaying the plurality of search results and the plurality of recommended items in the search webpage; and receiving a triggering operation on at least some of the plurality of recommended items and displaying the recommended contents corresponding to the recommended items triggered within the search webpage according to the triggering operation, wherein analyzing the plurality of search results so as to obtain the plurality of recommended items comprises:

obtaining identity information of a user;

querying a server according to the identity information of the user to obtain an interested point of the user pre-stored in the server, wherein the interested point comprises either keywords known from the search history of the user or pre-stored keywords of the user;

selecting a plurality of key words matched with the interested point of the user from the plurality of search results as the plurality of recommended items, wherein a part of the recommended contents corresponding to the recommended items triggered within the search webpage comprises related entities of the recommended items triggered within the search webpage, and displaying the recommended contents corresponding to the recommended items triggered within the search webpage according to the triggering operation comprises:

providing a first displaying part and a second displaying part in the search webpage, displaying the plurality of search results in the first displaying part and displaying the recommended contents corresponding to the recommended items triggered in the second displaying part, wherein another part of the recommended contents corresponding to the recommended items triggered within the search webpage comprises descriptions of the recommended items, and displaying the recommended contents corresponding to the recommended items triggered within the search webpage according to the triggering operation comprises:

providing a floating layer display window around the triggered recommended items and displaying the recommended contents corresponding to the triggered recommended items in the floating layer display window.

8. The non-transitory computer-readable storage medium according to claim 7, the one or more programs are further for executing an act of:

displaying recommending marks on the plurality of recommended items in the search webpage.

9. The non-transitory computer-readable storage medium according to claim 7, wherein the triggering operation is a mouseover operation or click operation.

* * * * *

UNITED STATES PATENT AND TRADEMARK OFFICE
CERTIFICATE OF CORRECTION

PATENT NO. : 10,051,030 B2
APPLICATION NO. : 14/577684
DATED : August 14, 2018
INVENTOR(S) : Jizhou Huang et al.

Page 1 of 1

It is certified that error appears in the above-identified patent and that said Letters Patent is hereby corrected as shown below:

On the Title Page

Item (56), OTHER PUBLICATION page 2:
Please delete "English translation of the Japanese Office Action dated Aug. 9, 2016 for corresponding JP Application No. 201410145997.X" and ""English translation of the Japanese Office Action dated Jan. 9, 2017 for corresponding JP Application No. 201410145997.X"
And insert -- English translation of the Chinese Office Action dated Aug. 9, 2016 for corresponding CN Application No. 201410145997.X -- and -- English translation of the Chinese Office Action dated Jan. 9, 2017 for corresponding CN Application No. 201410145997.X --

In the Claims

In Column 12 Line 46:
Please delete "search results and the plurality f recommended items in"
And insert -- search results and the plurality of recommended items in --

Signed and Sealed this
Twelfth Day of March, 2019

Andrei Iancu
*Director of the United States Patent and Trademark Office*